United States Patent [19]

Koshiishi et al.

[11] Patent Number: 4,905,092
[45] Date of Patent: Feb. 27, 1990

[54] CONDENSATION-FREE DATA READING MACHINE

[75] Inventors: Takaho Koshiishi, Tokyo; Shiro Uchida, Isehara, both of Japan

[73] Assignee: Ricoh Company, Ltd., Tokyo, Japan

[21] Appl. No.: 265,955

[22] Filed: Nov. 2, 1988

[30] Foreign Application Priority Data

Nov. 4, 1987 [JP] Japan ................................ 62-277370

[51] Int. Cl.⁴ .............................................. H04N 1/23
[52] U.S. Cl. ................................ 358/296; 346/107 R; 350/582
[58] Field of Search ............... 358/256, 263, 285, 296, 358/474, 475, 400; 355/30; 350/582, 584; 219/216, 220, 219; 346/107 R

[56] References Cited

U.S. PATENT DOCUMENTS 2,693,589  4/1952  Hopkins ............................. 219/219

Primary Examiner—B. A. Reynolds
Assistant Examiner—Scott A. Rogers
Attorney, Agent, or Firm—Oblon, Spivak, McClelland, Maier & Neustadt

[57] ABSTRACT

A compact, handy type facsimile machine includes a light source for illuminating an original, a line image sensor for optically reading the original, a condensation sensor for detecting formation of water droplets by condensation on the image sensor, and a control circuit for activating the light source when the condensation sensor has detected the formation of water droplets by condensation on the image sensor. Thus, upon occurrence of condensation, the condensation sensor generates a detection signal, and, in response thereto, the light source is lit to produce heat which then causes the water droplets formed on the image sensor to disappear. Upon disappearance of such water droplets, the control circuit deactivates the light source if there is no original to be read.

6 Claims, 5 Drawing Sheets

CONDENSATION-FREE DATA READING MACHINE

BACKGROUND OF THE INVENTION

1. Field of the Invention

This invention generally relates to a data reading machine and in particular to a facsimile machine having a contact type image sensor which is so structured to prevent water droplets from being formed by condensation.

2. Description of the Prior Art

Compact and handy data reading machines such as facsimile machines capable of being carried as connected to a belt placed around the shoulder of a human being or as mounted on a vehicle are becoming popular in the recent years, and these compact facsimile machines are used, for example, for transmitting instructions to delivery vehicles of package delivery services. Such hand-carry type facsimile machines are often used outdoors and experience an environment which is much worse in conditions than the environment which is encountered by ordinary facsimile machines which are used inside buildings, such as offices or at home. Thus, if such a handy facsimile machine is used outdoors, when the temperature of the environment in which the facsimile machine is placed changes abruptly, condensation could occur inside of the machine so that water droplets could be formed on various parts of the machine. When such condensation takes place, water droplets or dew are formed on a contact glass of an image reading optical system so that an original document could become stuck to the contact glass when brought into contact therewith to cause jamming of the original document. Depending on the amount of formation of water droplets on the contact glass, the original document is not properly transported over the contact glass or it becomes stuck to the contact glass to cause jamming. In the former case, the original image cannot be properly read by an image sensor, and in the latter case, the original document could be damaged.

It has been proposed to detect the occurrence of condensation or formation of water droplets by condensation in various machines, such as copying machines and facsimile machines. And, in accordance with the conventional scheme, when the occurrence of condensation has been detected, the entire system is halted until the water droplets thus formed by condensation inside a housing disappears, or a fan is driven to send the outside air into the machine, or a heater is activated to increase the temperature inside the machine. However, in the former case, an extremely long period of time is required, and in the latter two cases, extra components, such as a fan or heater, must be provided, which occupy an extra storage space inside the machine. Thus, these conventional schemes cannot be applied to handy facsimile machines because such handy facsimile machines require quick operation and do not have any extra space for such extra components.

SUMMARY OF THE INVENTION

In accordance with the present invention, there is provided a compact data reading machine including an LED source, a contact type image sensor for optically reading an original document to be transmitted, and a condensation sensor for detecting the occurrence of condensation at the image sensor, said condensation sensor generating a detection signal upon detection of the occurrence of condensation at the image sensor, and a control means for controlling the operation of the light source, the image sensor and the condensation sensor such that the light source is lit to produce heat in response to a detection signal from the condensation sensor. Thus, upon detection of occurrence of condensation, i.e., formation of water droplets, on the image sensor, the light source is lit to produce heat to increase the temperature inside the image sensor until the water droplets formed of the image sensor by condensation disappears. In the preferred embodiment, the data reading machine is a facsimile machine also includes a thermal printhead, and in this case, the thermal printhead is also activated to produce heat inside the facsimile machine.

It is therefore a primary object of the present invention to obviate the disadvantages of the prior art as described above and to provide an improved reading machine.

Another object of the present invention is to provide an improved data reading machine capable of keeping an image sensor free of formation of water droplets due to condensation.

A further object of the present invention is to provide a handy, compact data reading machine which is not adversely affected by changes of temperature in the surrounding environment.

A still further object of the present invention is to provide an improved data reading machine which may be used outdoors without trouble.

Other objects, advantages and features of the present invention will become apparent from the following detailed description of the invention when considered in conjunction with the accompanying drawings.

DESCRIPTION OF THE PREFERRED EMBODIMENTS

Figure 1:
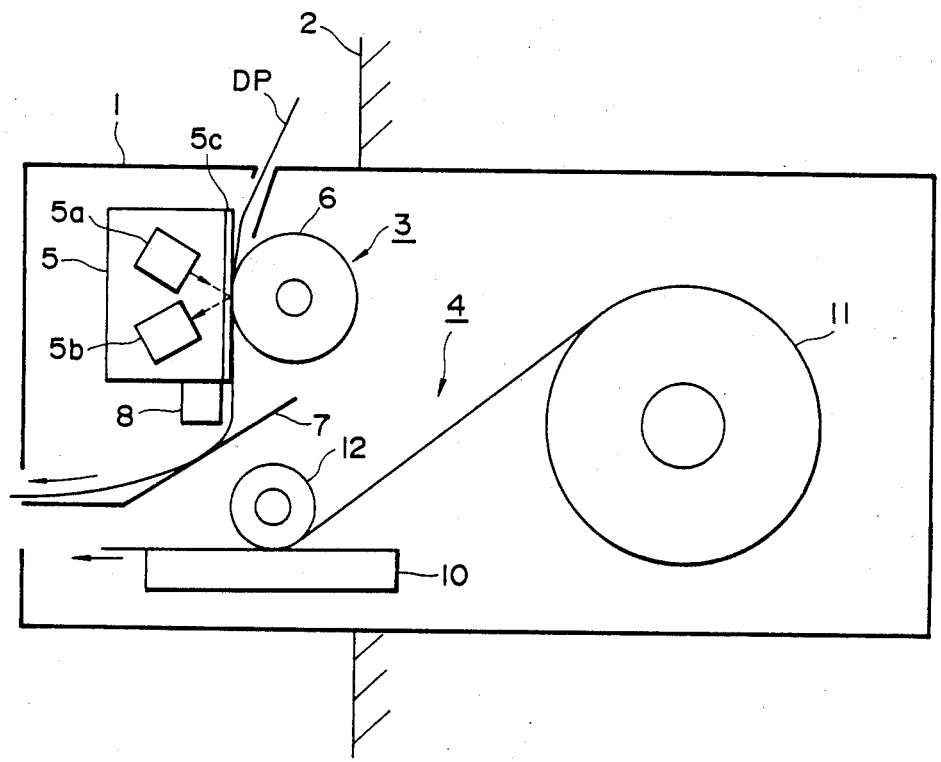
FIG. 1 is a schematic illustration showing the overall structure of a facsimile machine constructed in accordance with one embodiment of the present invention.

Referring to FIG. 1, there is schematically shown a data reading machine in the form of a facsimile machine 1 constructed in accordance with one embodiment of the present invention, and the illustrated facsimile machine 1 is a radio facsimile machine which is mounted on a vehicle. As shown, the facsimile machine 1 has its rear half located behind a front panel 2 of an automobile when it is detachably mounted in position, and the facsimile machine 1 may be pulled out of the mounting space for repair or maintenance. The facsimile machine 1 includes an image reading mechanism 3 for optically reading an original document to be transmitted and an image recording mechanism 4 located below the image reading mechanism 3 for recording the received image on a sheet of recording medium, such as photosensitive paper.

The image reading mechanism 3 includes a contact type image sensor assembly 5 which optically reads an original image of an original DP to be transmitted on a one-to-one basis. The image sensor assembly 5 includes a light-emitting diode array 5a as a light source for illuminating a line of the original DP to be optically read, a unity magnification image sensor 5b for receiving the light reflected from the original DP to thereby optically read the original DP line by line on a pixel-by-pixel basis, and a contact glass 5c to which the original DP is brought into contact to locate a section of the original DP to be optically read at a predetermined location. The light-emitting diode array 5a includes a plurality of light-emitting diodes arranged at a predetermined pitch in the form of an array extending in a direction normal to the sheet of drawing of FIG. 1. An original transportation roller 6 is disposed pressed against the contact glass 5c so that the original DP is kept pressed against the contact plate 5c at a predetermined reading line as it is transported by the roller 6. A guide plate 7 is disposed below the image sensor assembly 5 to receive the original DP from the image sensor assembly 5 and guide it toward the exterior of the machine through a discharge slot. A condensation sensor 8 is mounted on the image sensor assembly 5 for detecting the occurrence of formation of water droplets by condensation.

The image recording mechanism 4 includes a thermal printhead 10 which is disposed horizontally below the image reading mechanism 3 and a platen roller 12 which is pressed against the thermal printhead 10. A sheet of recording paper unwound from a roll 11 is passed between the thermal printhead 10 and the platen roller 12 so that an image may be recorded on the sheet of recording paper line by line as it is transported along the thermal printhead 10 as pressed thereagainst. Although not shown specifically, the thermal printhead 10 typically includes a plurality of heat-producing or resistor elements arranged at a predetermined pitch in the form of an array extending in a direction normal to the plane defined by the sheet of FIG. 1.

In operation, when an operator inserts an original document DP into the facsimile machine 1 from an insertion slot provided at the top surface of a housing, the original document DP is transported by the roller 6 as pressed against the contact glass 5c, whereby the original image is optically read by the image sensor 5b, and then the original document DP is discharged out of the machine through its discharge slot formed in the front end of the housing. On the other hand, when the facsimile machine 1 receives image information from a remote transmitter facsimile machine, the image information is recorded on the sheet of recording paper 11 and the that portion of the recording paper 11 on which the image has been recorded is discharged out of the machine through the discharge slot. Thus, the recorded portion of the recording paper 11 may be torn away by the operator.

When the operator wishes to install a new roll of recording paper 11, the operator first pulls the facsimile machine 1 out of the front panel 2 over a predetermined length and opens a cover (not shown) to expose a recording paper roll storing section of the facsimile machine 1. Under this condition, a new roll of recording paper 11 is installed in position and the leading portion of the recording paper 11 unwound from the roll is passed between the thermal printhead 10 and the platen roller 12.

Figure 2:
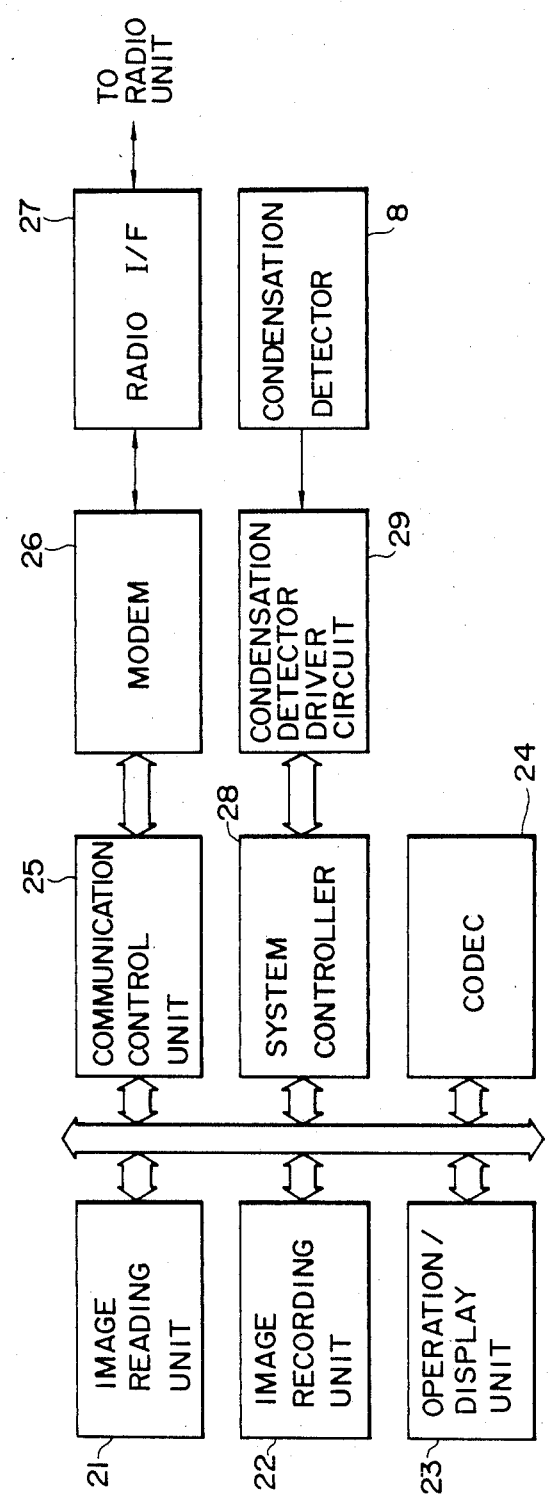
FIG. 2 is a block diagram showing a control system of the facsimile machine of FIG. 1.

FIG. 2 illustrates in block diagram the overall structure of a control system incorporated in the facsimile machine 1 shown in FIG. 1. As shown, the control system includes an image reading unit 21 for driving the image reading mechanism 3 and it typically includes a driver circuit for activating or lighting the light-emitting diode array 5a, a driver circuit for driving the unity magnification image sensor 5b and a driver circuit for driving the original transport roller 6. Also provided in the control system is an image recording unit 22 for driving and controlling the operation of the image recording mechanism 4, and it includes a driver circuit for driving the thermal printhead 10, a driver circuit for driving the platen roller 12 and a paper end detecting circuit for detecting the paper end of the recording paper 11.

The control system also includes an operation and display unit 24 which is an interface between an operator and the facsimile machine 1 for providing various operational instructions to the facsimile machine 1 and displaying various operation conditions of the facsimile machine 1. Thus, the operation and display unit 24 is provided with a plurality of switches or keys and display elements. Also provided is a codec 24 which compresses the image data obtained by the image sensor unit 5 by coding before transmission to a receiver facsimile machine at a remote place and decompresses received image data by decoding to restore the original image data which is then recorded on the sheet of recording paper 11 by the thermal printhead 10. A communication control unit 25 is also provided and it will execute a predetermined radio facsimile communication control procedure to carry out communication for transmission or reception of image data with another facsimile machine at a remote place. A MODEM 26 is provided for modulating and demodulating digital image data for transmission or after reception. A radio interface 27 is also provided for connection to a radio unit (not shown) which transmits or receives image data through the air.

The control system also includes a system controller 28 which is in charge of the overall control of the present facsimile machine 1. A condensation sensor driver circuit 29 is connected to the system controller 28 and it is also connected to the condensation (dew formation) sensor 8. When the condesation sensor 8 detects the occurrence of condensation, or formation of water droplets by condensation, a detection signal is supplied to the system controller 28. These components including image reading unit 21, image recording unit 22, operation and display unit 23, codec 24, communication control unit 25 and system controller 28 are all interconnected by a system bus and various information is exchanged among the components through this system bus.

Figure 3:
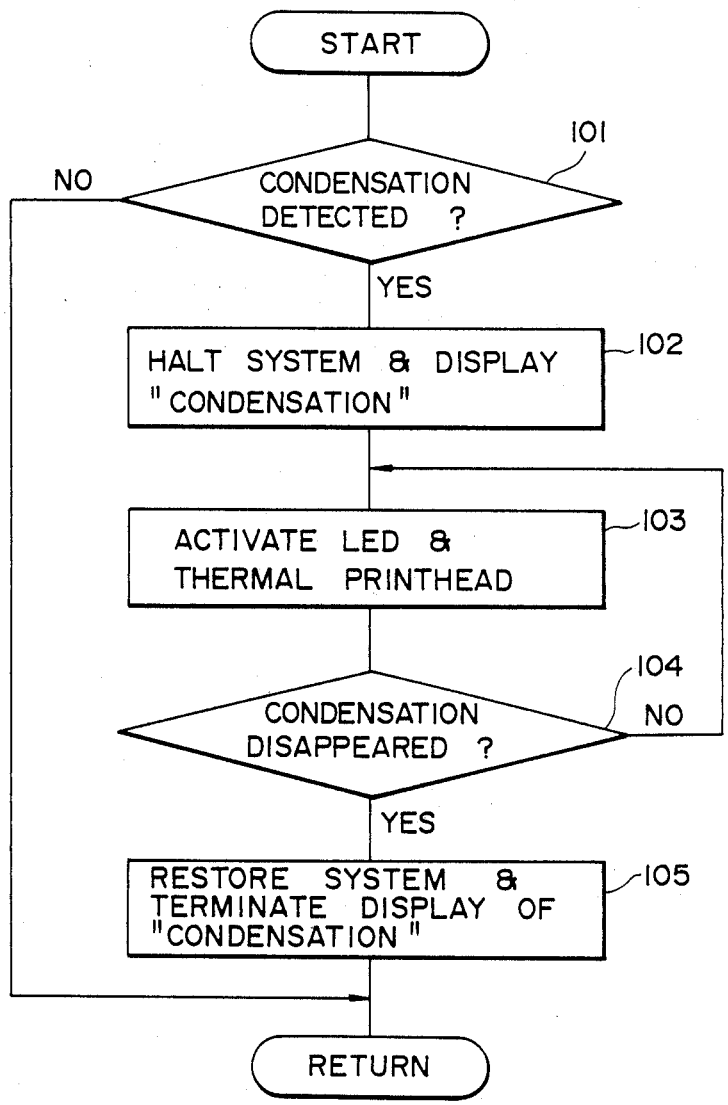
FIG. 3 is a flow chart showing a sequence of steps of monitoring the occurrence of condensation which may be advantageously applied to the structure shown in FIGS. 1 and 2.

With the above-described structure, under a power-up condition, the system controller 28 executes a subroutine or sequence of steps shown in FIG. 3 at a predetermined time interval to thereby monitor the occurrence of condensation or formation of water droplets by condensation at the contact type image sensor assembly 5. That is, in accordance with a detection signal from the condensation sensor driver circuit 29, the system controller 28 examines whether or not water droplets have been formed at step 101 in the flow chart of FIG.

3. And if the result of determination at step 101 is affirmative, the operation of the system is temporarily halted and a condensation lamp or the like (not shown) of the operation and display unit 23 is lit to indicate to the operator of the fact that condensation has occurred and water droplets have been formed at the image sensor assembly 5 at step 102. In response thereto, the light-emitting diode array 5a of the contact type image sensor array 5 is lit and at the same time driver current is supplied to the thermal printhead 10 at step 103. As a result, both of the light-emitting diode array 5a and the thermal printhead 10 are activated to produce heat therefrom. This loop of steps including steps 103 and 104 is repetitively carried out until a detection signal from the condensation sensor driver circuit 29 indicates the disappearance of the water droplets which have been formed by condensation, i.e., until the time when the result of determination at step 104 becomes negative.

Since both of the light-emitting diode array 5a and the thermal printhead 10 are activated, the heat produced by these components causes the temperature inside the facsimile machine 1 to increase, so that the water droplets formed inside the housing of the facsimile machine 1, e.g., at the contact type image assembly 5 and at the thermal printhead 10, by condensation gradually disappears. Thus, as soon as the result of determination at the step 104 becomes affirmative as a result of disappearance of the water droplets formed by condensation, the system controller 28 restores the system in an operative condition and at the same time extinguish the condensation lamp of the operation and display unit 23 to thereby indicate the disappearance of condensed water droplets to the operator at step 105.

As described above, in accordance with the present embodiment, as soon as the formation of water droplets by condensation at the contact type image sensor assembly 5 and the thermal printhead 10, which could significantly affect the proper operation of the present facsimile machine 1, has been detected, both of the light-emitting diode array 5a of the contact type image sensor assembly 5 and the thermal printhead 10 are activated and the heat is produced by the array 5a and the thermal printhead 10 to cause the water droplets formed by condensation to disappear. Therefore, in accordance with the present embodiment, the water droplets formed by condensation may be removed quickly and without providing extra components for causing the water droplets to disappear.

In the above-described embodiment, both of the light-emitting diode array 5a and the thermal printhead 10 are activated in response to a condensation detection signal; however, as an alternative embodiment, it can also be so structured that either one of these two components, preferably the light-emitting diode array 5a, is activated in response to such a condensation detection signal. In the above-described embodiment, the condensation sensor 8 is disposed in the vicinity of the contact type image sensor assembly 5 and no other condensation sensor is provided. As an alternative embodiment, an additional condensation sensor may also be provided in the vicinity of the thermal printhead 10. However, in the case where the image sensor assembly 5 and the thermal printhead 10 are disposed to be relatively close to each other as in the above-described embodiment, the provision of only one such condensation sensor would be sufficient. The above-described embodiment is the case where the present invention has been applied to a compact facsimile machine to be mounted on a vehicle; however, the present invention may also be applied to other compact facsimile machines which use an automobile telephone unit or which may be carried by a shoulder band.

Figure 4:
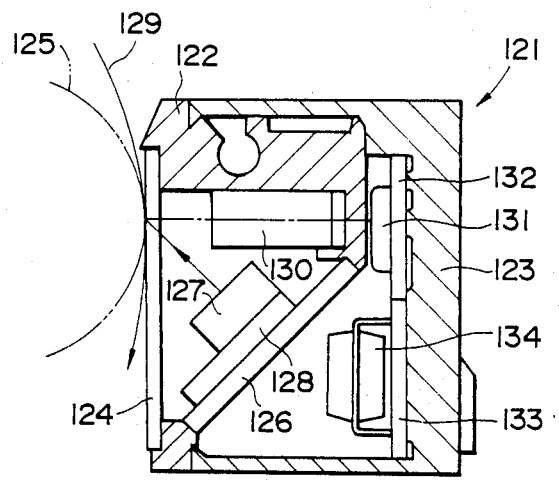
FIGS. 4 and 5 are schematic illustrations showing in cross section other examples of a contact type image sensor assembly which may be advantageously applied to the present invention.

FIG. 4 illustrates a contact type image sensor assembly 121 which is constructed in accordance with another embodiment of the present invention and which may be advantageously applied to the facsimile machine 1 shown in FIGS. 1 and 2. The image sensor assembly 121 includes an upper support frame 122 and a lower support frame 123 both of which define a housing of the assembly 121. The image sensor assembly 121 has a generally rectangular cross section and elongated in shape in the main scanning (optical scanning) direction which is normal to the plane defined by the sheet of FIG. 4. A contact glass 124 is fixedly attached to the upper support frame 122, and a roller 125 of a scanner unit is pressed against the contact glass 124. Both of the upper and lower support frames 122 and 123 are preferably comprised of aluminum. The upper support frame 122 supports a light-emitting diode (LED) array 127, which constitutes a light source of the assembly 121, through a holder plate 126, and the LED array 127 is mounted on a substrate 128 which in turn is mounted on the holder plate 126.

The holder plate 126 is comprised of a material having a small thermal conductivity, such as an epoxy family resin, to thereby limit the amount of heat to be transmitted from the LED array 127 to the upper support frame 122. The LED array 127 is elongated in the main scanning direction, and the substrate 128 is a circuit board comprised of an aluminum plate on which a thin layer of epoxy family resin is formed. The LED array 127 illuminates an original 29 fed between the roller 125 and the contact glass 124 and the light reflected by the original 29 is incident upon a rod lens array 130 supported by the upper support frame 122.

The lower support frame 123 supports thereon a photoelectric conversion unit 131 through a substrate 132, and the substrate 132 is comprised of ceramics or glass. As the photoelectric conversion unit 131, use may be made of a CCD including a plurality of photoelectric elements arranged at a predetermined pitch to define an array extending in the main scanning direction. For example, for A4 size originals, the photoelectric conversion unit 131 is comprised by three silicon crystal chips, each of which includes a plurality of photoelectric elements at the rate of 8 photoelectric elements per 1 mm, for example. That is, the photoelectric conversion unit 131 includes a plurality of photoelectric elements arranged in the form of an array extending in the main scanning direction, and each of the photoelectric elements converts the incident light information into a corresponding electrical signal.

A driver IC 134 is also mounted on the lower support frame 123 through a substrate 133 which is, for example, comprised of an epoxy family resin. This driver IC 134 is an IC for driving the photoelectric conversion unit 131. The light incident upon the rod lens array 130 is focused onto the photoelectric conversion unit 131, and the photoelectric conversion unit 131 receives the incident light by each of its photoelectric elements to thereby produce pixel information of the number corresponding to the number of the photoelectric elements provided in the photoelectric conversion unit 131. Each of the photoelectric elements of the photoelectric conversion unit 131 converts incident light into a corresponding electrical signal which is then output as an image data.

In operation, the LED array 127 of the image sensor assembly 121 illuminates the original 129 through the contact glass 124 and the light reflected by the original 129 passes through the contact glass 124 and enters the rod lens array 130 to be focused onto the photoelectric conversion unit 131, where the incident light is subjected to photoelectric conversion to thereby produce image data. When the LED array 127 is activated in this manner, it produces heat which is transferred to the holder plate 126 through the substrate 128. Since the holder plate 126 is comprised of a material having a relatively small heat conductivity, the holder plate 126 tends to prevent the heat produced by the LED array 127 from being transferred to the upper support frame 122. Thus, the amount of heat transfer to the photoelectric conversion unit 131 through the upper and lower support frames 122 and the substrate 132 may be minimized. As a result, a rise of temperature of the photoelectric elements of the photoelectric conversion unit 131 may be minimized.

Figure 5:
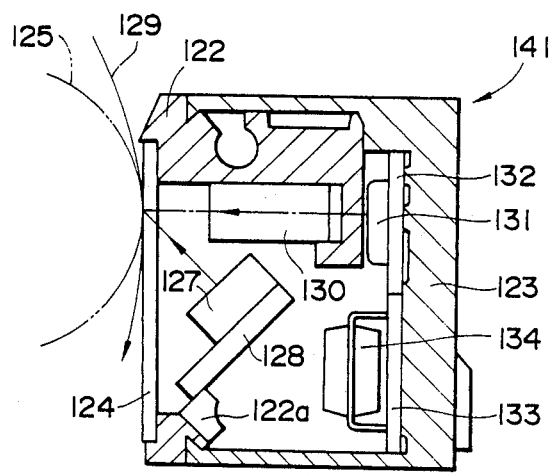

FIG. 5 illustrates a contact type image sensor assembly 141 constructed in accordance with another embodiment of the present invention, and this embodiment is similar in structure in many respects to the embodiment shown in FIG. 4 so that like numerals indicate like elements. The present embodiment differs from the embodiment shown in FIG. 4 only in the structure of holding the substrate 128 on which the LED array 127 is mounted. That is, in the present embodiment, a holder projection 122a is formed as a part of the upper support frame 122 for supporting thereon the substrate 128 and thus the LED array 127. In this embodiment, the holder projection 122a is comprised of a material having a relatively small heat conductivity. And, if the holder projection 122a is comprised as an integral part of the upper support frame 122, the upper support frame 122 should be comprised of a material having a relatively small heat conductivity.

Figure 6:
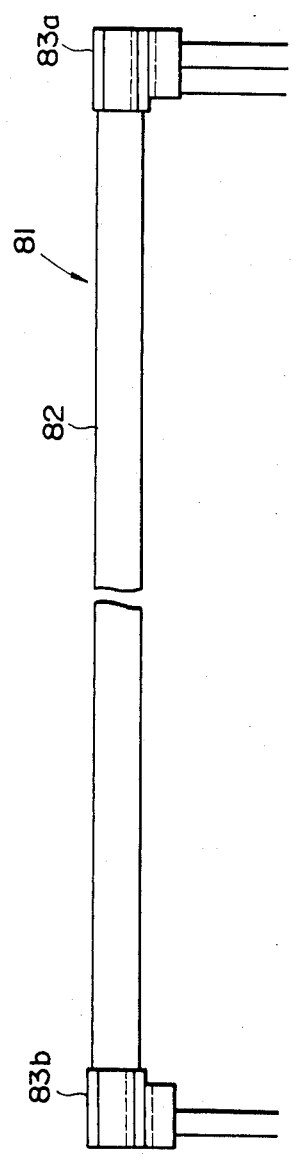
FIGS. 6 and 7 are schematic illustrations showing other examples of a light source which may be advantageously applied to the present invention.
Figure 7:
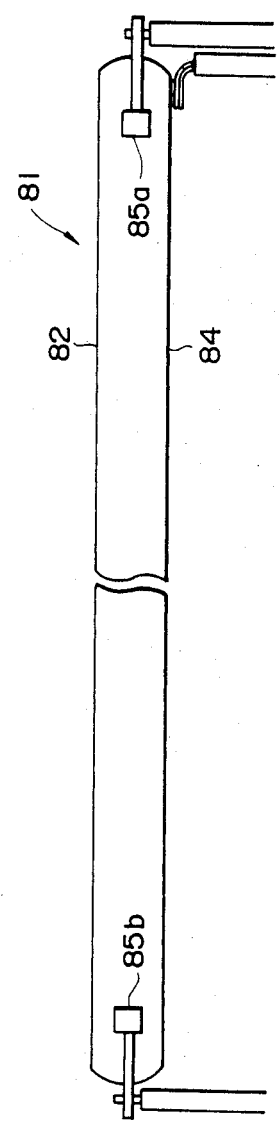

In place of the LED array 127, use may be made of any other type of light source. For example, FIGS. 6 and 7 illustrate a xenon lamp 81 which may be provided in the image sensor assembly 121 or 131. As shown in FIG. 6 and 7, the xenon lamp 81 includes a tube 82, a pair of connectors 83a and 83b and an auxiliary electrode 84. Also provided inside of the tube 82 is a pair of electrodes 85a and 85b which are electrically connected to the respective connectors 83a and 83b. This xenon lamp 81 may be mounted on the holder plate 126 in place of the LED array 127. When the xenon lamp 81 is mounted on the holder plate 126, since the auxiliary electrode 84, which is required for arc discharge of the xenon lamp 81, must be maintained in contact with the tube 82, the tube 82 is directly brought into contact with the holder plate 126 with the auxiliary electrode 84 sandwiched therebetween.

As a further alternative embodiment, use may also be made of a fluorescent lamp in place of the xenon lamp 81. In this case also, such a fluorescent lamp may be provided as mounted on the holder plate 126 in a manner similar to that described above in relation to xenon lamp 81.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A data reading machine comprising:
   an LED type light source for illuminating an original;
   image reading means for optically reading said original;
   a condensation·sensor for detecting formation of water droplets by condensation on said image reading means, said condensation sensor generating a detection signal upon detection of formation of water droplets by condensation on said image reading means; and
   means for activating said light source in response to said detection signal, whereby said light source is lit to produce heat which is applied to said image reading means to cause said water droplets to disappear.

2. The machine of claim 1, wherein said light source is elongated in shape to apply a line of illumination to said original.

3. The machine of claim 2, wherein said light source includes a plurality of light-emitting elements arranged in the form of an array.

4. The machine of claim 1, wherein said image reading means includes a line image sensor comprised of a plurality of photoelectric elements arranged in the form of an array.

5. The machine of claim 4, wherein said line image sensor is of the contact type having unitary magnification.

6. The machine of claim 1, wherein said data reading machine is a facsimile machine, further comprising a thermal printhead and transporting means for transporting a sheet of recording paper along said thermal printhead, whereby said thermal printhead is also activated in response to said detection signal.

* * * * *